(12) United States Patent
Marupaduga

(10) Patent No.: US 10,051,683 B1
(45) Date of Patent: Aug. 14, 2018

(54) WIRELESS REPEATER CHAIN CHANNEL CONTROL

(71) Applicant: Sprint Communications Company L.P., Overland Park, KS (US)

(72) Inventor: Sreekar Marupaduga, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 4 days.

(21) Appl. No.: 15/443,205

(22) Filed: Feb. 27, 2017

(51) Int. Cl.
| | |
|---|---|
| *H04W 4/00* | (2018.01) |
| *H04W 76/30* | (2018.01) |
| *H04W 76/06* | (2009.01) |
| *H04L 12/26* | (2006.01) |
| *H04W 72/04* | (2009.01) |

(52) U.S. Cl.
CPC ......... *H04W 76/30* (2018.02); *H04L 43/0888* (2013.01); *H04L 43/16* (2013.01); *H04W 72/0453* (2013.01); *H04W 76/06* (2013.01)

(58) Field of Classification Search
CPC . H04W 76/30; H04W 76/06; H04W 72/0453; H04L 43/16; H04L 43/0888
See application file for complete search history.

(56) References Cited

U.S. PATENT DOCUMENTS

| | | | |
|---|---|---|---|
| 7,050,758 B2 | 5/2006 | Dalgleish et al. | |
| 7,206,873 B1* | 4/2007 | Hennecken | G06F 3/0613 |
| | | | 360/18 |
| 7,596,352 B2 | 9/2009 | Ding et al. | |
| 7,764,925 B2 | 7/2010 | Cleveland et al. | |
| 7,844,216 B2 | 11/2010 | Cleveland et al. | |
| 7,990,904 B2 | 8/2011 | Proctor, Jr. et al. | |
| 8,060,009 B2 | 11/2011 | Gainey et al. | |
| 8,116,254 B2 | 2/2012 | Sabat et al. | |
| 8,122,134 B2 | 2/2012 | Proctor, Jr. et al. | |
| 8,472,868 B2 | 6/2013 | Mu et al. | |
| 8,660,035 B2 | 2/2014 | Zhang et al. | |
| 8,767,631 B2 | 7/2014 | Shao et al. | |
| 8,929,303 B2 | 1/2015 | Wang et al. | |
| 9,252,857 B2 | 2/2016 | Negus et al. | |
| 9,930,668 B2* | 3/2018 | Barzegar | H04W 72/0453 |
| 2003/0123401 A1* | 7/2003 | Dean | H04B 7/15535 |
| | | | 370/318 |
| 2004/0110468 A1* | 6/2004 | Perlman | H04B 7/18517 |
| | | | 455/13.3 |

(Continued)

*Primary Examiner* — Clemence S Han

(57) ABSTRACT

A wireless access point controls wireless channels in a wireless repeater chain. The wireless access point exchanges wireless user data with User Equipment (UEs) over the wireless repeater chain. The wireless access point monitors average UE data throughput through the wireless repeater chain, variance in the average UE throughput, and an amount of Guaranteed Bit Rate (GBR) connections through the wireless repeater chain. The wireless access point disables wireless channels when the average UE data throughput falls below a data threshold and the amount of GBR connections exceeds a connection threshold. The wireless access point selects wireless channels to disable based on the variance in the average UE throughput. The wireless access point transfers instructions to selected wireless repeaters to disable the selected wireless channels.

20 Claims, 6 Drawing Sheets

(56) References Cited

U.S. PATENT DOCUMENTS

| | | | |
|---|---|---|---|
| 2004/0110469 A1* | 6/2004 | Judd | G01S 19/25 455/15 |
| 2009/0098824 A1* | 4/2009 | Rofougaran | H04B 7/2606 455/13.1 |
| 2009/0122744 A1 | 5/2009 | Maltsev et al. | |
| 2010/0284446 A1* | 11/2010 | Mu | H04B 7/15521 375/211 |
| 2012/0307668 A1 | 12/2012 | Wiemann et al. | |
| 2016/0029384 A1* | 1/2016 | Sidhu | H04W 72/0453 370/329 |
| 2017/0366246 A1* | 12/2017 | Braz | H04B 7/0413 |

* cited by examiner

US 10,051,683 B1

WIRELESS REPEATER CHAIN CHANNEL CONTROL

TECHNICAL BACKGROUND

Data communication systems exchange user data for user devices to provide various data communication services. The user devices may be phones, computers, media players, and the like. The data communication services might be media streaming, audio/video conferencing, data messaging, or internet access. Wireless communication networks are deployed to extend the range and mobility of these data communication services.

The typical wireless communication network has several macro-cell base stations that provide radio coverage over large urban areas. The macro-cell base stations may still not be able to cover every part of the urban area with enough capacity. Outside of the urban areas, the macro-cell base stations may be too large for environments like inter-state highways and smaller towns. Wireless repeaters are deployed to alleviate these problems.

A wireless repeater has antennas, amplifiers, and digital signal processors to receive, digitally process, and re-transmit wireless data signals. The macro-cell base station exchanges wireless data signals over wireless bands. The wireless bands are separated into wireless channels. The wireless repeaters receive and re-transmit the wireless data signals over these bands and channels.

Unfortunately, a chain of wireless repeaters may become too long for its load. The number of Guaranteed Bit Rate (GBR) connections and the number of wireless repeater hops may become too great to handle with adequate quality. Thus, macro-cell base stations do not efficiently and effectively control the wireless channels in wireless repeater chains in response to repeater load and performance.

TECHNICAL OVERVIEW

A wireless access point controls wireless channels in a wireless repeater chain. The wireless access point exchanges wireless user data with User Equipment (UEs) over the wireless repeater chain. The wireless access point monitors average UE data throughput through the wireless repeater chain, variance in the average UE throughput, and an amount of Guaranteed Bit Rate (GBR) connections through the wireless repeater chain. The wireless access point disables wireless channels when both the average UE data throughput falls below a data threshold and the amount of GBR connections exceeds a connection threshold. The wireless access point selects wireless channels to disable based on the variance in the average UE throughput. The wireless access point transfers instructions to selected wireless repeaters to disable the selected wireless channels.

DETAILED DESCRIPTION

Figure 1:
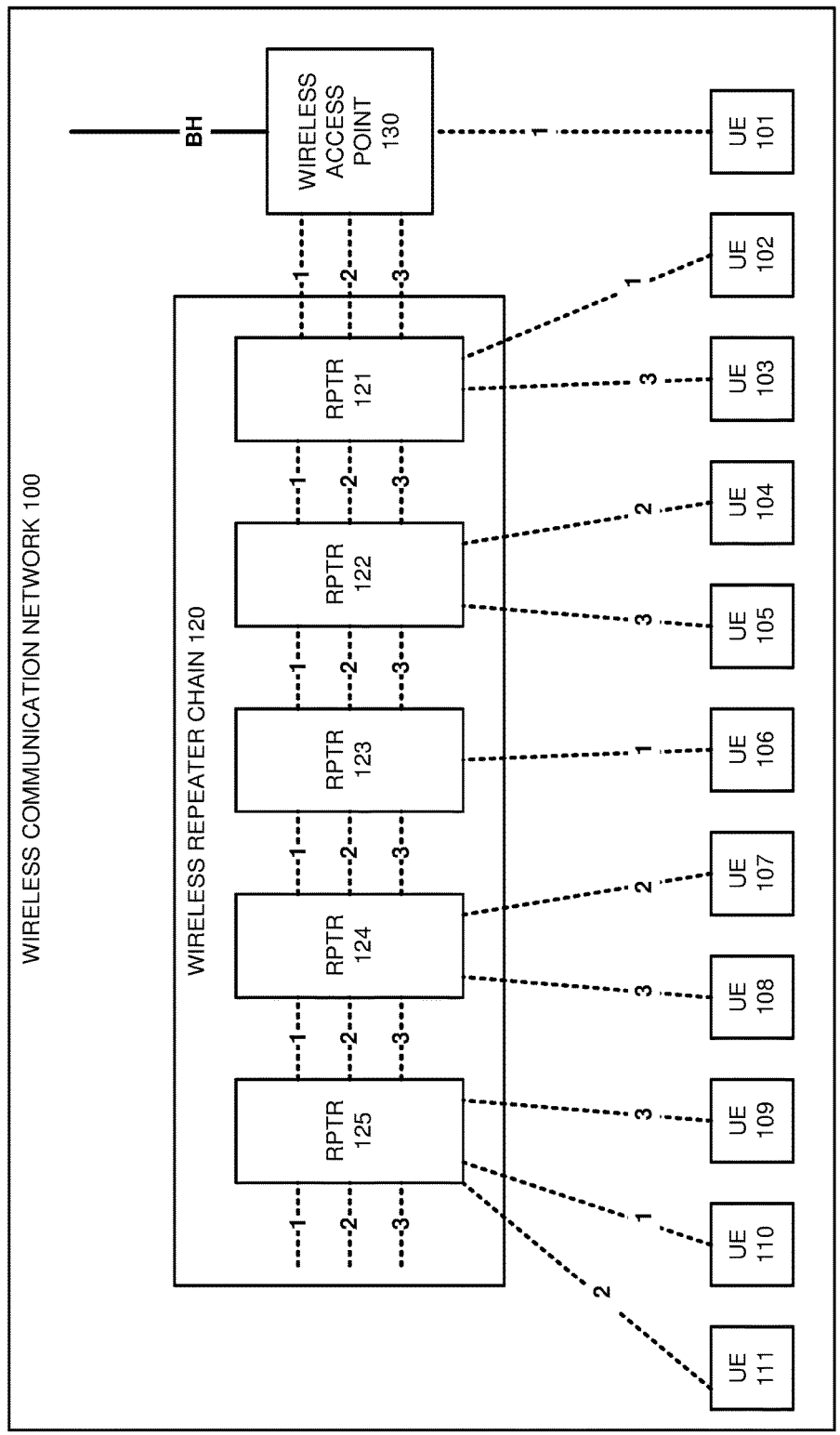
FIGS. 1-2 illustrate a wireless communication network with a wireless access point to control wireless channels in a wireless repeater chain.
Figure 2:
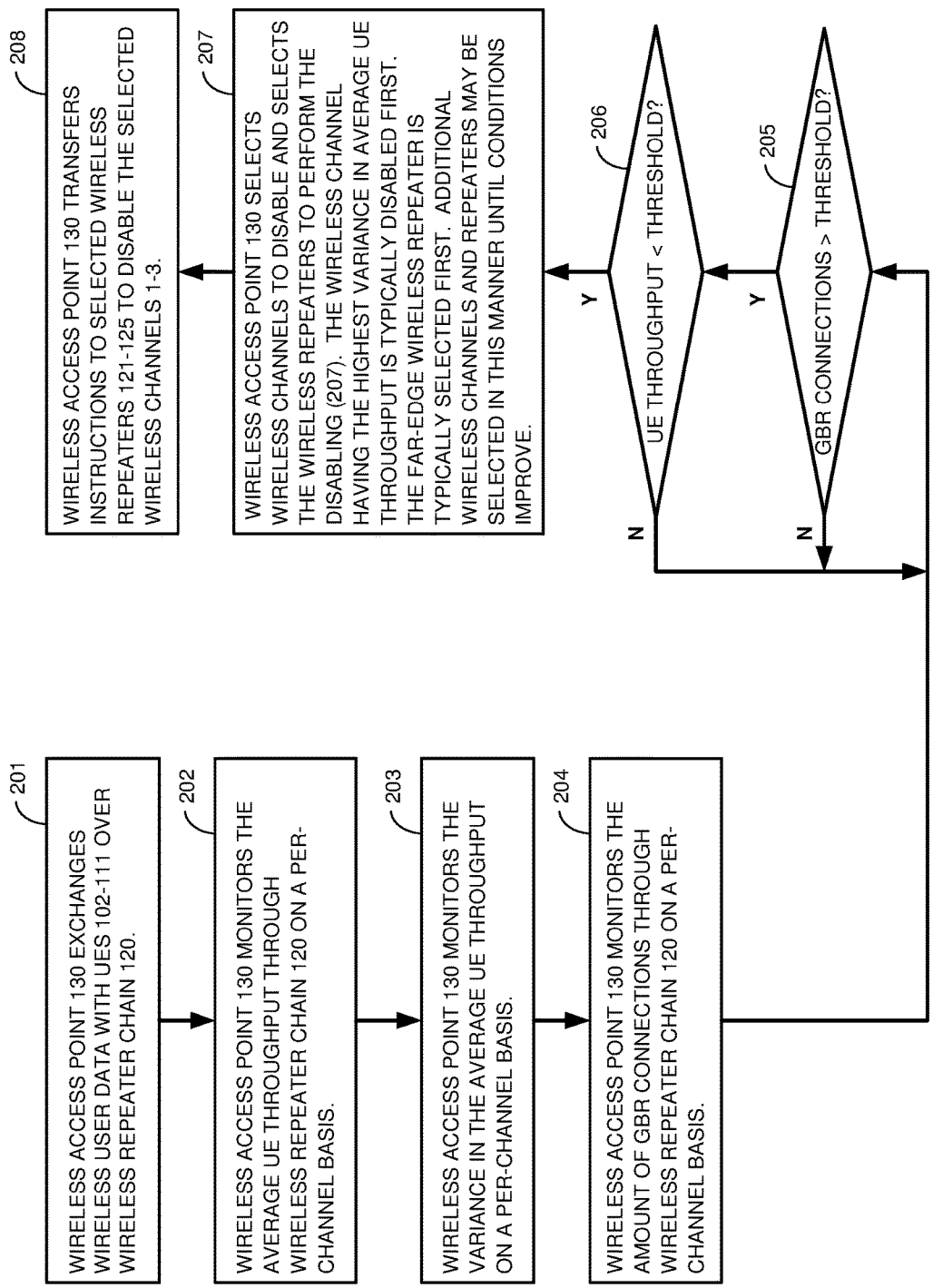

FIGS. 1-2 illustrate wireless communication network 100 with a wireless access point 130 to control wireless channels 1-3 in wireless repeater chain 120. Wireless communication network 100 exchanges user data for wireless User Equipment (UEs) 101-111. UEs 101-111 comprise computers, phones, or some other intelligent machines with RF communication components. The user data exchanges support data services such as content streaming, media conferencing, machine communications, internet access, or some other computerized information service. The typical number of UEs would be much higher, and the number depicted herein has been restricted for clarity.

Referring to FIG. 1, wireless communication network 100 comprises wireless UEs 101-111, wireless repeater chain 120, and wireless access point 130. Wireless repeater chain 120 comprises wireless repeaters (RPTR) 121-125. Wireless access point 130 transmits and/or receives wireless user data over a wireless band that is channelized into wireless channels 1-3. An exemplary wireless band is in the giga-hertz range and is several hundred mega-hertz wide. An exemplary channel is fifty or one-hundred mega-hertz wide. Other wireless band sizes and channel sizes could be used. Wireless access point 130 exchanges the user data with network systems over backhauls data links (BH).

Wireless access point 130 could be an evolved NodeB, wireless base station, or some other intelligent machine with RF communication components. Wireless access point 130 is made of computer hardware like Central Processing Units (CPUs), Random Access Memory (RAM), persistent data storage, bus interfaces, and data communication transceivers. The data communication transceivers include antennas, amplifiers, filters, and digital signal processors for wireless data communication. Wireless access point 130 also has computer software like operating systems, baseband applications, network applications, and channel control applications. Wireless repeaters 121-125 are made of communications hardware like antennas, amplifiers, filters, digital/analog converters, digital signal processors, control circuitry, and the like. The control circuitry and digital signal processors execute computer software like digital filters, digital amplifiers, digital attenuators, and automatic gain control.

In operation, a data transceiver system in wireless access point 130 exchanges wireless user data with UEs 102-111 over wireless repeater chain 120. In particular, the wireless transceiver system exchanges wireless user data with UE 101 and wireless repeater 121 over wireless channels 1-3. Wireless repeater 121 exchanges wireless user data with UEs 102-103 and wireless repeater 122 over wireless channels 1-3. Wireless repeater 123 exchanges wireless user data with UE 106 and wireless repeater 124 over wireless channels 1-3. Wireless repeater 124 exchanges wireless user data with UEs 107-108 and wireless repeater 125 over wireless channels 1-3. Wireless repeater 125 exchanges wireless user data with UEs 109-111 over wireless channels 1-3.

In wireless access point 130, a data processing system monitors the average UE data throughput through wireless repeater chain 120 on a per-channel basis. The data processing system monitors the variance in the average UE data on a per-channel basis. The data processing system also monitors the amount of Guaranteed Bit Rate (GBR) connections through wireless repeater chain 120 on a per-channel basis.

When the average UE data throughput for all channels 1-3 falls below a data threshold and when the amount of GBR connections for all channels 1-3 exceeds a connection threshold, then the data processing system in wireless access point 130 selects wireless channels to disable and selects the wireless repeaters to perform the disabling. The data processing system performs the selections based on the variance in the average UE throughput on the wireless channels. For example, the wireless channel having the highest variance in average UE throughput is typically disabled first. The wireless channel having the highest number of GBR connections might be disabled. Wireless repeater 125 is at the far-edge of wireless repeater chain 120 from wireless access point 130, and the far-edge repeater is usually selected to initially disable wireless channels. The data processing system transfers instructions from wireless access point 130 to selected wireless repeaters 121-125 to disable the selected wireless channels 1-3. Before disabling a channel, wireless access point 130 first transitions the affected UEs away from the disabled channel and to another channel that will remain enabled.

Referring to FIG. 2, the operation of wireless access point 130 is described. Wireless access point 130 exchanges wireless user data with UEs 102-111 over wireless repeater chain 120 (201). Wireless access point 130 monitors the average UE throughput through wireless repeater chain 120 on a per-channel basis (202). Wireless access point 130 monitors the variance in the average UE throughput on a per-channel basis (203). Wireless access point 130 also monitors the amount of GBR connections through wireless repeater chain 120 on a per-channel basis (204). When the amount of GBR connections for all channels exceeds a connection threshold (205) and when the average UE data throughput for all channels falls below a data threshold (206), then wireless access point 130 selects wireless channels to disable and selects the wireless repeaters to perform the disabling (207). The wireless channel having the highest variance in average UE throughput is typically disabled first. The far-edge wireless repeater is typically selected first. Additional wireless channels and repeaters may be selected in this manner until conditions improve. Wireless access point 130 transfers instructions to selected wireless repeaters 121-125 to disable the selected wireless channels 1-3 (208). As conditions improve, wireless access point 130 performs a reciprocal process to enable the disabled wireless channels.

Figure 3:
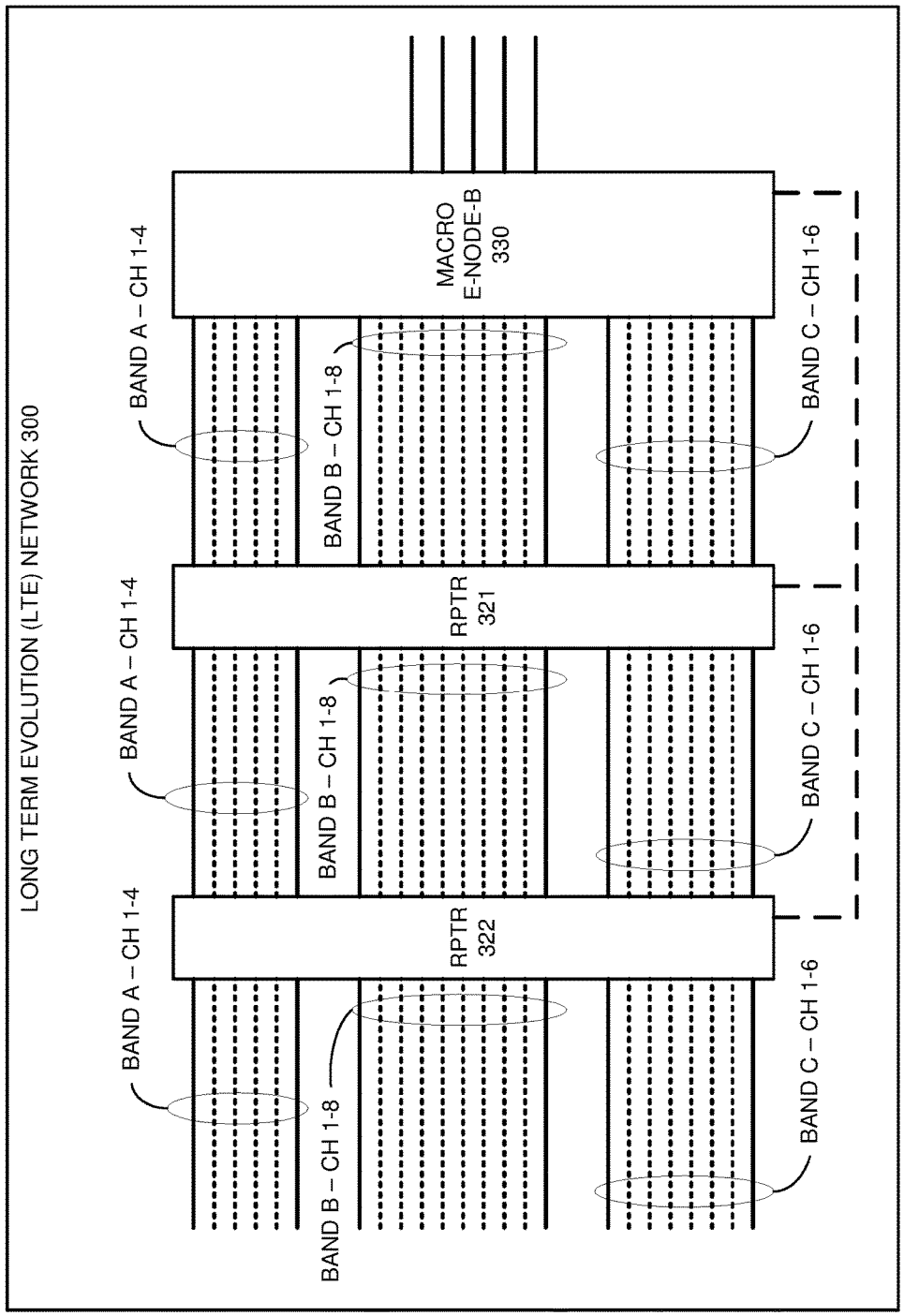
FIG. 3 illustrate a Long Term Evolution network with an eNodeB to control wireless channels in a wireless repeater chain.

FIG. 3 illustrates Long Term Evolution network 300 with eNodeB 330 to control wireless channels in a wireless repeater chain. LTE network 300 comprises wireless repeaters 321-322 and macro eNodeB 330. Macro eNodeB 330 transmits and receives wireless user data over a wireless bands A, B, and C. Band A has 4 channels. Band B has 8 channels. Band C has 6 channels. The number of repeaters and wireless channels is usually higher and has been restricted for clarity. The UEs are also omitted for clarity.

Macro eNodeB 330 and wireless repeater 321 exchange wireless user data over wireless bands A, B, and C and their component wireless channels. Wireless repeaters 321-322 also exchange wireless user data over wireless bands A, B, and C and their component wireless channels. Macro eNodeB 330 monitors the average UE throughput and the number GBR connections through repeaters 321-322. Macro eNodeB 330 uses a control link (dashed line) to control wireless repeaters 321-322.

If the average UE throughput falls below a data threshold when the amount of GBR connections exceeds a connection threshold, then macro eNodeB 330 selects wireless channels and wireless repeaters to disable. Macro eNodeB 330 typically disables wireless channels having the most variance in the average UE throughput the far-edge repeater. For example, macro eNodeB 330 may direct wireless repeater 322 to disable two wireless channels in wireless band B that have the most throughput variance. The wireless channels having the highest number of GBR connections may also be disabled. For example, macro eNodeB 330 may direct wireless repeater 322 to disable one wireless channel in wireless band C having excessive GBR connections. In some examples, the number of wireless channels and/or the number of wireless repeaters that perform the disablement are selected based on the throughput variance across the wireless band. Before disabling a channel, macro eNodeB 330 first transitions the affected UEs from the channel being disabled to another channel that will remain enabled.

If the average UE throughput remains below the data threshold and the amount of GBR connections still exceeds the connection threshold, then macro eNodeB 330 selects additional wireless channels and wireless repeaters to disable. Macro eNodeB 330 typically disables other wireless channels having the most variance in the average UE throughput at the far-edge repeater. Macro eNodeB 330 may also disable some of these wireless channels at the wireless repeater next to the far-edge repeater. For example, macro eNodeB 330 may direct wireless repeater 321 to disable the two wireless channels in wireless band B and the wireless channel in wireless band C.

When the average UE throughput moves above the threshold and the amount of GBR connections falls below the connection threshold, then macro eNodeB 330 selects wireless channels and wireless repeaters to enable. The enablement process is reciprocal and macro eNodeB 330 typically enables channels at the closest wireless repeater and works out from there as conditions permit.

Figure 4:
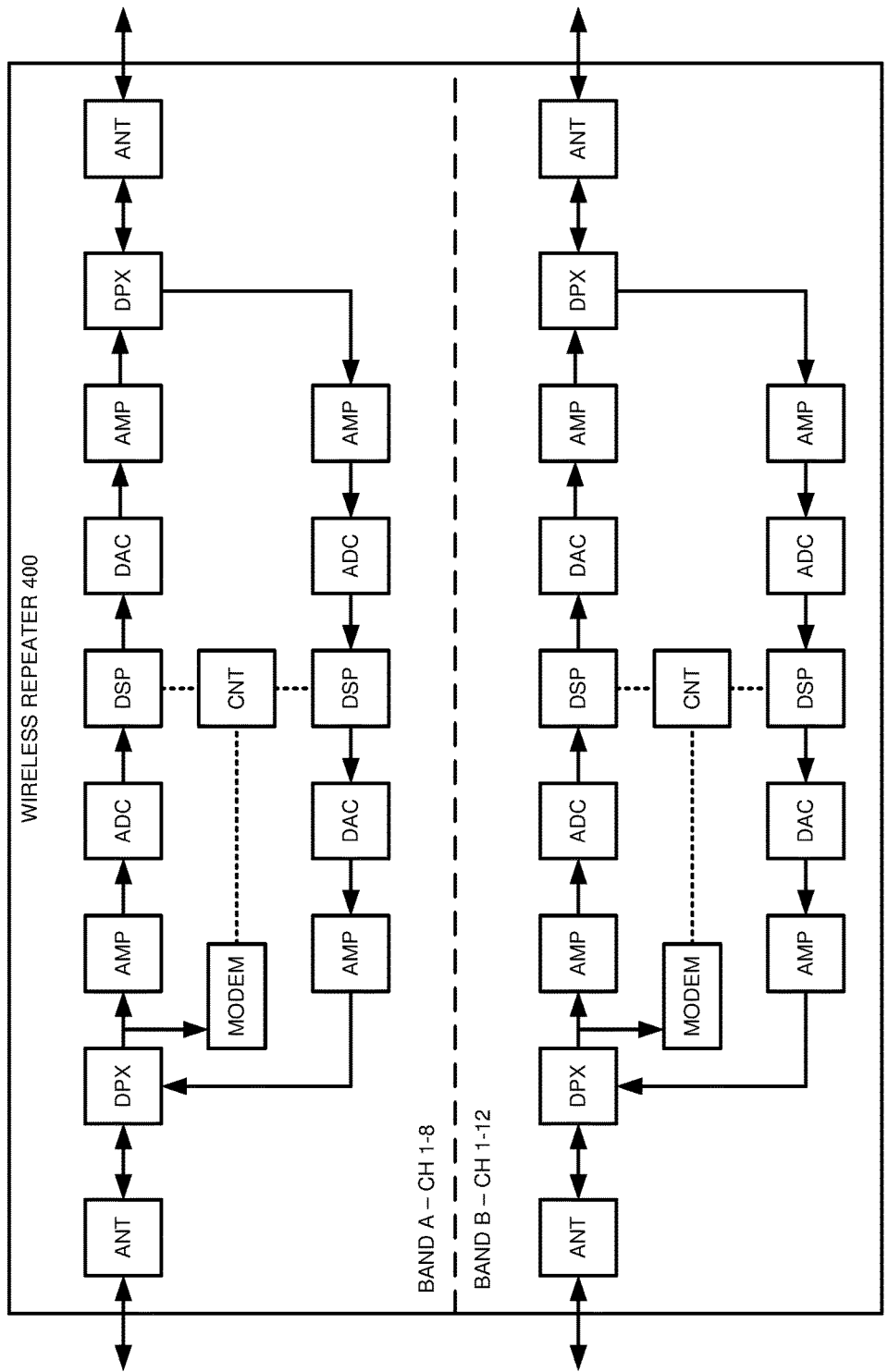
FIG. 4 illustrates a wireless repeater to control wireless channels in a wireless repeater chain.

FIG. 4 illustrates wireless repeater 400 to control wireless channels in a wireless repeater chain. Wireless repeater 400 comprises processing sections for Band A having channels 1-8 and Band B having channels 1-12.

For band A and from left to right at the top of the figure, the repeater components for the downlink are: antenna (ANT), duplexer (DPX), low-noise amplifier (AMP), analog-to-digital converter (ADC), digital signal processor (DSP), digital-to-analog converter (DAC), power amplifier (AMP), duplexer (DPX), and antenna (ANT). For band A and from right to left at the top of the figure, the repeater components for the uplink are: the antenna, the duplexer, a low-noise amplifier, analog-to-digital converter, digital signal processor, digital-to-analog converter, power amplifier, the duplexer, and the antenna.

On the downlink for band A, a modem receives and processes a split portion of the received wireless signal. The modem transfers gain control data to the controller (CNT). The controller adjusts the gain applied by the digital signal processors for both the uplink and downlink based on the gain control data. The section for Band B is similar to that for band A. Additional sections for more wireless bands and channels could be added.

On the downlink, the modem detects instructions from the wireless access point to enable or disable select wireless channels on the uplink and downlink. The modem transfers the instructions to the controller in the gain control data. If the instruction is to disable a wireless channel, then the controller directs the digital signal processors to attenuate all energy in the wireless channel spectrum. If the instruction is to enable a wireless channel, then the controller directs the digital signal processors to again use automatic gain control on the wireless channel.

Figure 5:
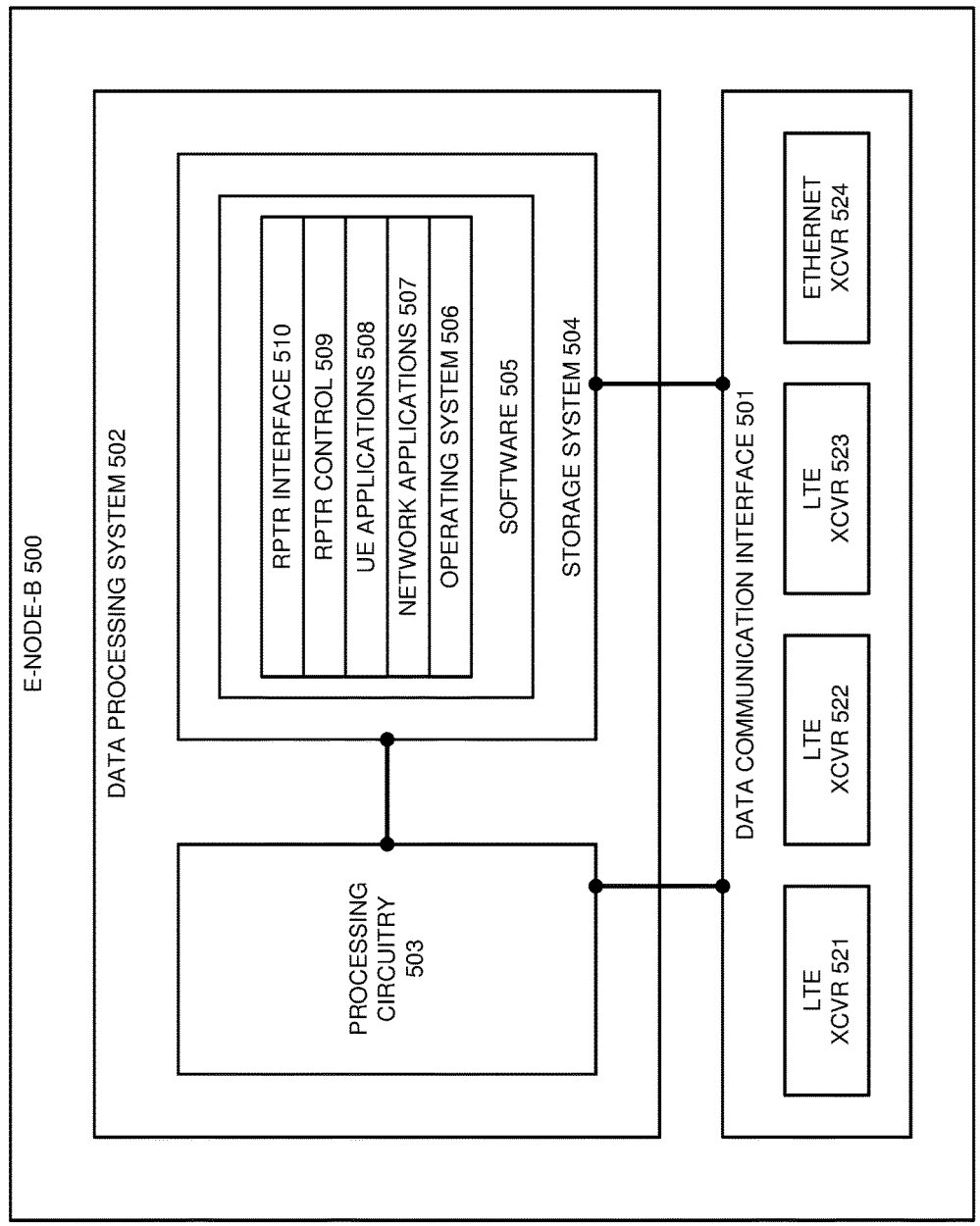
FIG. 5 illustrates an eNodeB to control wireless channels in a wireless repeater chain.

FIG. 5 illustrates eNodeB 500 to control wireless channels in a wireless repeater chain. eNodeB 500 is an example of the wireless access point 130 and eNodeB 330, although these base stations may use alternative configurations and operations. eNodeB 500 comprises data communication interface 501 and data processing system 502. Data communication interface 501 comprises Long Term Evolution (LTE) transceivers 521-523 and Ethernet transceiver 524. Data processing system 502 comprises processing circuitry 503 and storage system 504. Storage system 504 stores software 505. Software 505 includes respective software modules 506-510.

Ethernet transceiver 524 comprises communication components, such as ports, bus interfaces, signal processors, memory, software, and the like. LTE transceivers 521-523 comprises communication components, such as antennas, amplifiers, filters, modulators, signal processors, ports, bus interfaces, memory, software, and the like. Processing circuitry 503 comprises server blades, circuit boards, bus interfaces, CPUs, integrated circuitry, and associated electronics. Storage system 504 comprises non-transitory, machine-readable, data storage media, such as flash drives, disc drives, memory circuitry, servers, and the like. Software 505 comprises machine-readable instructions that control the operation of processing circuitry 503 when executed.

eNodeB 500 may be centralized or distributed. All or portions of software 506-510 may be externally stored on one or more storage media, such as circuitry, discs, and the like. Some conventional aspects of eNodeB 500 are omitted for clarity, such as power supplies, enclosures, and the like. When executed by processing circuitry 503, software modules 506-510 direct circuitry 503 to perform the following operations.

Operating system 506 interfaces between software modules 507-510 and eNodeB hardware (processing circuitry 503, data communication interface 501, RAM, storage). Network applications 507 control network RF protocols for network access over Ethernet transceiver 524. UE applications 508 interact with UEs over LTE transceivers 521-523. UE applications 508 determine average UE throughput, variance, and GBR connection amounts. Repeater (RPTR) control 509 selects wireless channels and repeaters to disable/enable based on the average UE throughput, variance, and GBR connection amounts. Repeater interface 510 generates and transfers instructions to individual wireless repeaters to disable/enable specific wireless channels.

Figure 6:
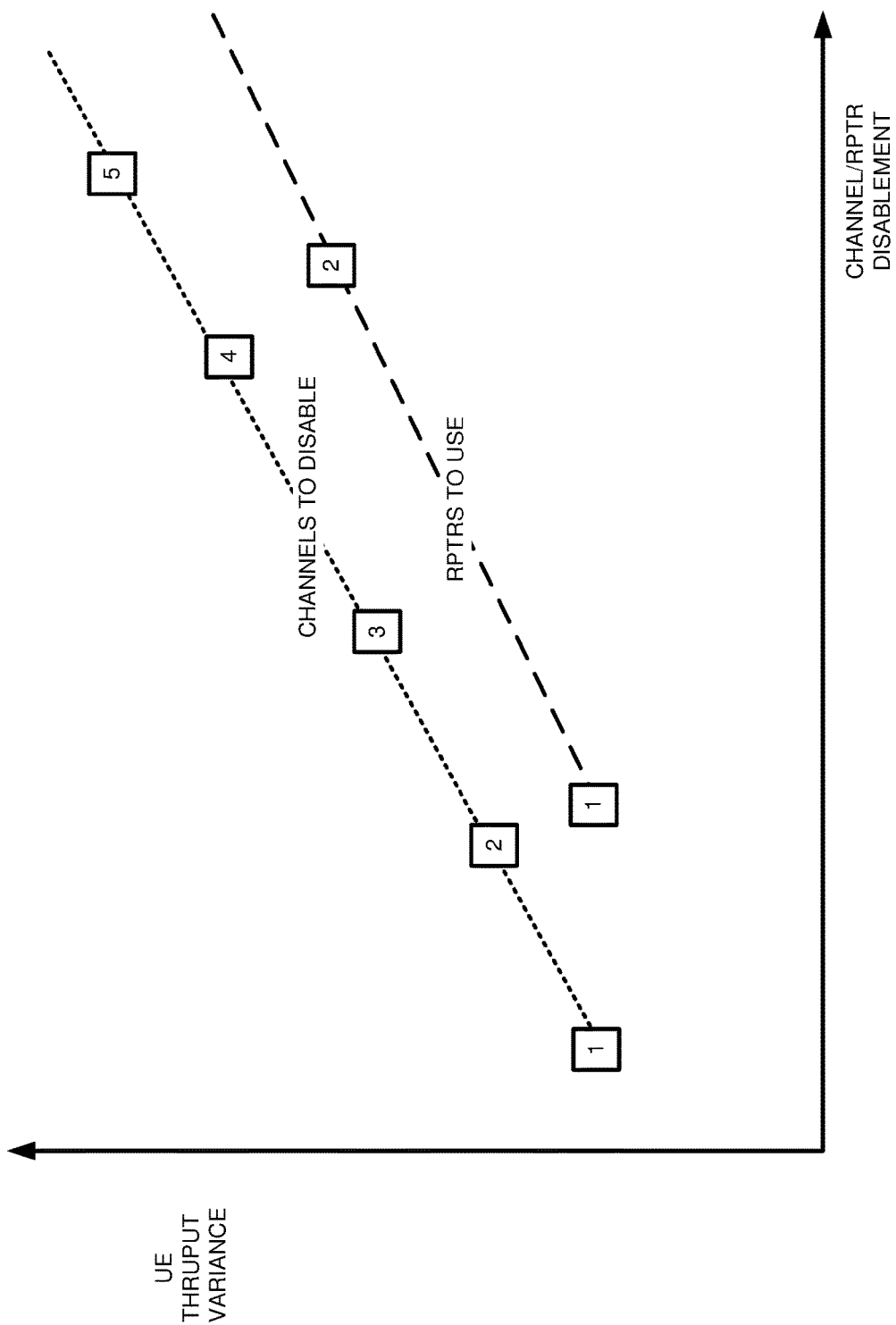
FIG. 6 illustrates eNodeB logic to control wireless channels in a wireless repeater chain.

FIG. 6 illustrates eNodeB logic to control wireless channels in a wireless repeater chain. The vertical axis represents the variance in the average UE throughput. The variance represents the magnitude between maximum and minimum throughput levels and the number of maximum and minimal transitions per time-frame. Throughput that constantly varies by small amounts is stable. Throughput that slowly varies by large amounts is also stable. Throughput that constantly varies by large amounts is not stable and drives the selection of channels to disable at wireless repeaters.

The horizontal axis represents the number of wireless channels to disable and the number of wireless repeaters to use for the disablement. The variance in average UE throughput is used to enter the vertical axis to identify the number of channels to disable. More channels are disabled as the throughput variance increases. The macro eNodeB disables the identified number of channels by selecting channels with the most GBR connections and/or the most variance. The variance in average UE throughput is also used to identify the number of wireless repeaters from the far-edge to perform channel disablement. More wireless repeaters disable wireless channels as the throughput variance increases. The eNodeB uses the furthest away wireless repeaters to initially perform channel disablement.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless access point to control wireless channels in a wireless repeater chain, the method comprising:

exchanging wireless user data with multiple User Equipment (UEs) over the wireless repeater chain;

monitoring average UE data throughput through the wireless repeater chain and a variance in the average UE throughput;

monitoring an amount of Guaranteed Bit Rate (GBR) connections through the wireless repeater chain;

when the average UE data throughput falls below a data threshold and when the amount of GBR connections exceeds a connection threshold, then selecting one of the wireless channels to disable at a wireless repeater based on the variance in the average UE throughput; and transferring an instruction to the wireless repeater to disable the one of the wireless channels.

2. The method of claim 1 wherein selecting the one of the wireless channels to disable comprises selecting one of the wireless channels having a highest variance in the average UE throughput.

3. The method of claim 1 wherein selecting the one of the wireless channels to disable comprises selecting one of the wireless channels having a highest number of GBR connections.

4. The method of claim 1 wherein selecting the one of the wireless channels to disable comprises selecting a number of the wireless channels to disable based on the variance in the average UE throughput.

5. The method of claim 1 wherein the wireless repeater comprises a far-edge wireless repeater in the wireless repeater chain.

6. The method of claim 1 comprising selecting a number of wireless repeaters based on the variance in the average UE throughput.

7. The method of claim 1 wherein selecting the one of the wireless channels to disable at the wireless repeater comprises selecting one of the wireless channels having a highest variance in the average UE throughput at a far-edge wireless repeater.

8. The method of claim 1 wherein the wireless access point comprises an eNodeB.

9. The method of claim 1 wherein the wireless channels comprise Long Term Evolution channels.

10. The method of claim 1 wherein a digital signal processor in the wireless repeater attenuates energy in the one of the wireless channels responsive to the instruction.

11. A wireless access point to control wireless channels in a wireless repeater chain, the wireless access point comprising:

a wireless transceiver system configured to exchange wireless user data with multiple User Equipment (UEs) over the wireless repeater chain;

a data processing system configured to monitor average UE data throughput through the wireless repeater chain, variance in the average UE throughput, and an amount of Guaranteed Bit Rate (GBR) connections through the wireless repeater chain; and the data processing system configured, when the average UE data throughput falls below a data threshold and when the amount of GBR connections exceeds a connection threshold, to select one of the wireless channels to disable at a wireless repeater based on the variance in the average UE throughput and transfer an instruction to the wireless repeater to disable the one of the wireless channels.

12. The wireless access point of claim 11 wherein the data processing system is configured to select one of the wireless channels having a highest variance in the average UE throughput.

13. The wireless access point of claim 11 wherein the data processing system is configured to select one of the wireless channels having a highest number of GBR connections.

14. The wireless access point of claim 11 wherein the data processing system is configured to select a number of the wireless channels to disable based on the variance in the average UE throughput.

15. The wireless access point of claim 11 wherein the data processing system is configured to select a far-edge wireless repeater in the wireless repeater chain.

16. The wireless access point of claim 11 wherein the data processing system is configured to select a number of wireless repeaters based on the variance in the average UE throughput.

17. The wireless access point of claim 11 wherein the data processing system is configured to select one of the wireless channels having a highest variance in the average UE throughput at a far-edge wireless repeater.

18. The wireless access point of claim 11 wherein the wireless access point comprises an eNodeB.

19. The wireless access point of claim 11 wherein the wireless channels comprise Long Term Evolution channels.

20. The wireless access point of claim 11 wherein a digital signal processor in the wireless repeater attenuates energy in the one of the wireless channels responsive to the instruction.

* * * * *